United States Patent [19]

Bloom

[11] Patent Number: 4,821,163
[45] Date of Patent: Apr. 11, 1989

[54] START-UP CIRCUIT FOR AN INTEGRATED-MAGNETIC POWER CONVERTER

[76] Inventor: Gordon E. Bloom, 115 Duran Dr., San Rafael, Calif. 94903

[21] Appl. No.: 137,494

[22] Filed: Dec. 23, 1987

[51] Int. Cl.⁴ .................................... H02M 7/5375
[52] U.S. Cl. ........................................ 363/49; 363/97
[58] Field of Search .................. 323/901; 363/49, 97

[56] References Cited

U.S. PATENT DOCUMENTS

| | | | |
|---|---|---|---|
| 3,553,620 | 1/1971 | Cielo et al. | |
| 3,694,726 | 9/1972 | Cielo et al. | |
| 4,047,089 | 9/1977 | Suzuki et al. | 363/49 |
| 4,063,307 | 12/1977 | Stephens | 363/21 |
| 4,202,031 | 5/1980 | Hesler et al. | 363/49 |
| 4,257,087 | 3/1981 | Cuk | 363/16 |
| 4,262,328 | 4/1981 | Bloom et al. | 363/16 |
| 4,322,788 | 3/1982 | Yoshida | 363/49 |
| 4,355,352 | 10/1982 | Bloom et al. | 363/16 |
| 4,538,219 | 8/1985 | Morris et al. | 363/26 |
| 4,561,046 | 12/1985 | Kuster | 363/21 |
| 4,675,796 | 6/1987 | Gautherin et al. | 363/20 |
| 4,675,797 | 6/1987 | Vinciarelli | 363/21 |
| 4,688,160 | 8/1987 | Fraidlin | 363/21 |
| 4,694,386 | 9/1987 | de Sartre | 363/49 |
| 4,695,936 | 9/1987 | Whittle | 363/21 |

OTHER PUBLICATIONS

Modern DC-to-DC Switchmode Power Converter Circuits, by R. P. Severns and Gordon E. Bloom, Van Nostrand Reinhold Co., 1985.

Core Selection for and Design Aspects of an Integrated-Magnetic Forward Converter by E. Bloom, IEEE Applied Power Electronics Conference, New Orleans, Conference Proceedings, Apr., 1986, pp. 141-150.

New Integrated-Magnetic DC-DC Power Converter Circuits and Systems, by E. Bloom, IEEE Applied Power Electronics Conference, San Diego, Conference Proceedings, Mar. 2, 1987, pp. 57-66.

Primary Examiner—William H. Beha, Jr.

[57] ABSTRACT

An innovative start-up circuit is disclosed which uses ordinary solid-state components and which may be used with a wide variety of switched mode boost-buck integrated magnetic power converters, including those having only two winding bobbins, a boost section with enhanced gain, and several new and different core arrangements. The start-up circuit comprises a winding which is transformer coupled to the drive transformer, a capacitor which is charged by the application of power to the input of the converter, switching means for switching current from the input of the converter to the drive transformer in response to the charging of the capacitor, and means for preventing the capacitor from operating the switching means after the converter is placed into operation.

24 Claims, 11 Drawing Sheets

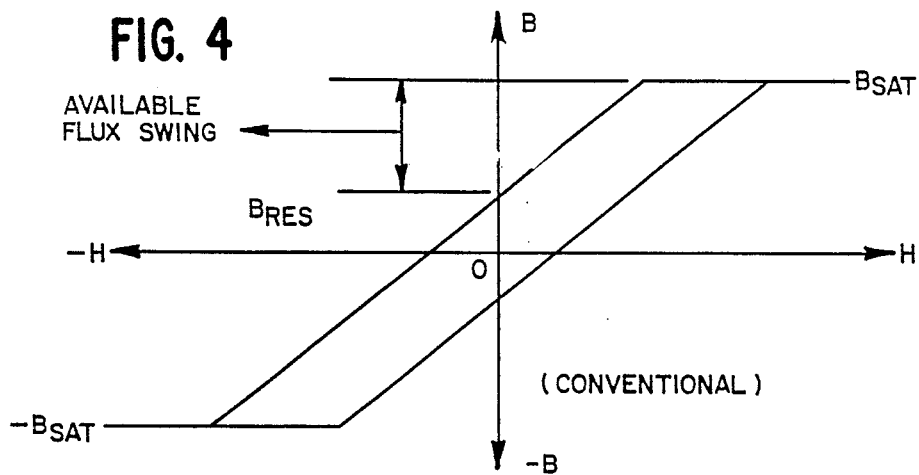
FIG. 4
(CONVENTIONAL)

FIG. 5
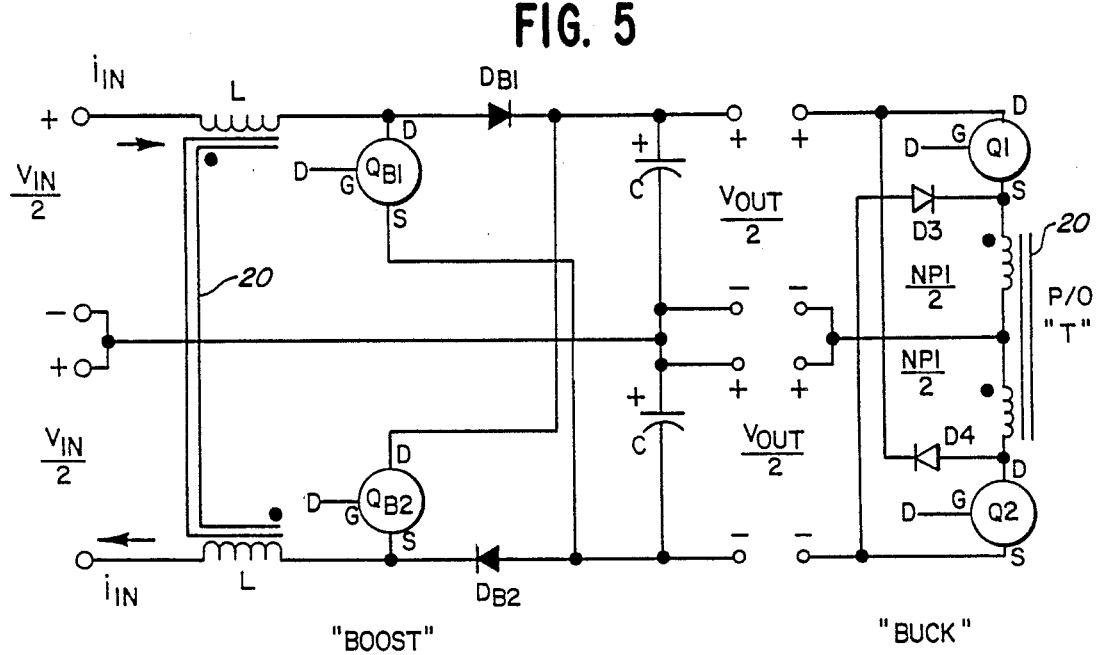
"BOOST"    "BUCK"
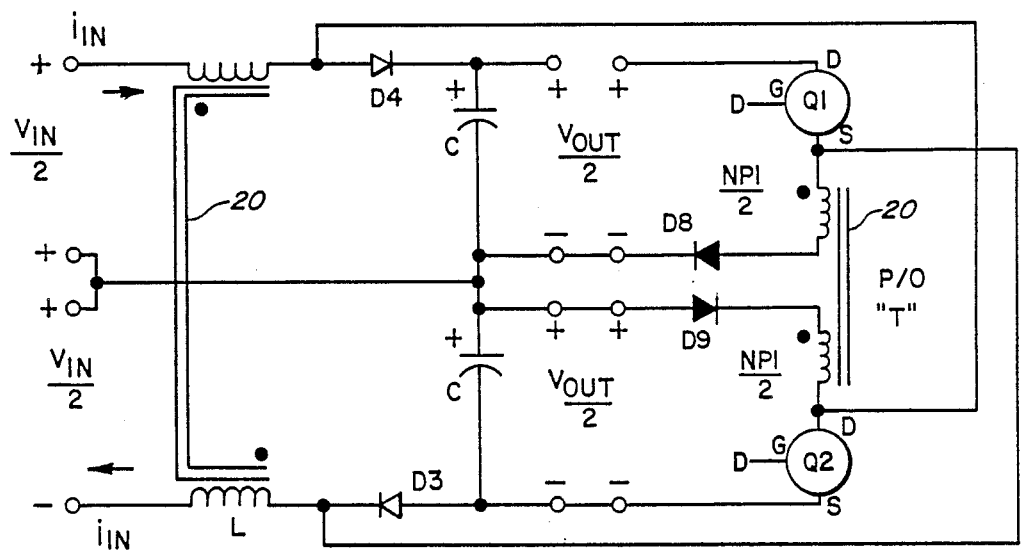
FIG. 5A

START-UP CIRCUIT

FIG. 11
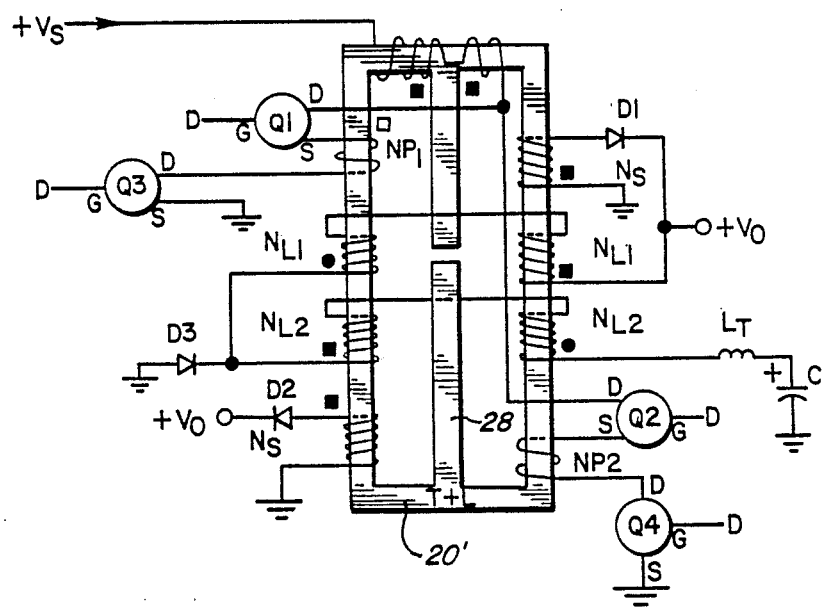
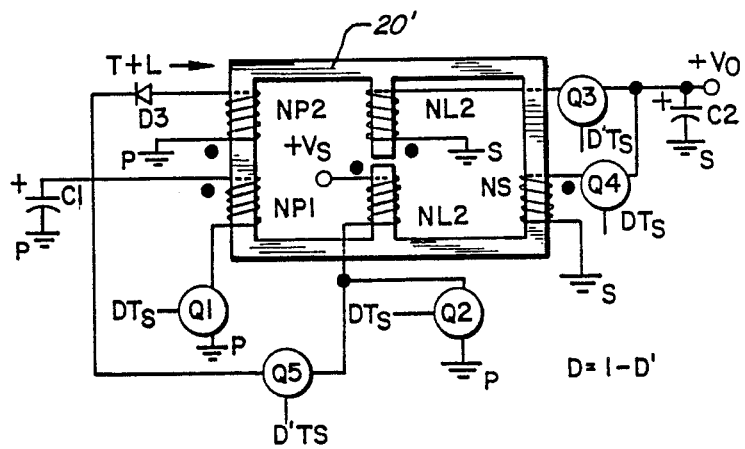
FIG. 12

START-UP CIRCUIT FOR AN INTEGRATED-MAGNETIC POWER CONVERTER

TECHNICAL FIELD

This invention relates, in general, to the subject of converters and power supplies and, in particular, to a control circuit for a converter which produces a plurality of DC output voltages from an AC supply voltage.

This application is related to two patent applications by the same inventor and filed on the same date; those patent applications are entitled, "INTEGRATED-MAGNETIC POWER CONVERTER" (Ser. No. 07/137,550, filed Dec. 23, 1987, and "INTEGRATED-MAGNETIC CONVERTER CORE" (Ser. No. 07/137548, filed Dec. 23, 1987.

BACKGROUND OF THE INVENTION

There have been significant advances in the microminiaturization of electronic systems and this has spurred the creation of space-saving switchmode conversion techniques for the design of highly efficient power processing equipment. An excellent overview of the state of the art is presented in the book "Modern DC-to-DC Switchmode Power Converter Circuits", by Rudolf P. Severns and Gordon E. Bloom, Van Nostrand Reinhold Company, 1985.

A continuing goal of electrical engineers has been the goal of reducing the physical size and parts count of switchmode power converters. The blending together or combining of inductors and transformers into single physical assemblies with little of no compromise in the desired conversion characteristics has been termed "integrated magnetics". One important reason for this effort has been the fact that inductors and transformers are major contributors to the total cost, weight and size of a converter system. Magnetic integration, if properly executed in the design of power converters, can bring added benefits in electrical performance, such as reduced stress on the components or lower ripple currents on input and output power lines. Chapter 12 of the textbook previously cited provides an excellent foundation on the subject of integrated magnetics. Two other pertinent publications are: *Core Selection for an Design Aspects of an Integrated—Magnetic Forward Converter*, by Ed Bloom, IEEE Applied Power Electronics Conference, New Orleans, Conference Proceedings, April 1986, pages 141-150; *New Integrated—Magnetic DC-DC Power Converter Circuits and Systems*, by Ed Bloom, IEEE Applied Power Electronics Conference, San Diego, Conference Proceedings, Mar. 2, 1987, pages 57-66. Some U.S. Patents on the subject of integrated magnetics and converters are: 4,675,797; 4,688,160; 4,675,796; 4,561,046; 4,538,219; 4,355,352; 4,262,328; 4,257,087; 3,694,726; 3,553,620.

However, the process of magnetic integration is not simple. For the most part, integrating magnetic elements of a converter does not add to the many design aspects and difficulties with which an engineer must contend during the converter's development phase. However, it does place additional burden on the designer to properly specify the performance of the integrated magnetic elements and a burden on the manufacturer to insure a consistent product which can be more complex than a simple transformer or inductor assembly. For example, there are some subtle electrical problems which arise when coupling inductors together on a common magnetic core. Imbalances in the required turns ratio relationships between the inductor and transformer windings can produce circulating currents in filter networks, resulting in excessive ripple current. High power loss in filter capacitors can result in converter damage and even destruction of the filter elements. Thus, integrated magnetics, as applied to switchmode power converter circuits, is a concept which is not straight-forward or easy to apply in practice.

Another example is the start-up circuit which is used to put the converter in operation. Heretofore, separate drive transformers and special solid-state components have been used. Such a design adds weight and does not contribute to an optimal use of equipment and components. U.S. Pat. Nos. 4,063,307; 4,694,386; and 4,695,936 are three examples of circuits that have been used to start or trigger a converter.

Any advancement that can be made and any teaching in this highly complex subject area will be welcomed by those skilled in the art, and any practical embodiment of these teachings will advance the state of the art. This is particularly true if subtle design considerations are highlighted and circuits are presented which result in unexpected improved performance or operating characteristics, especially when only a few components are added relative to conventional converter designs.

OBJECTS OF THE INVENTION

Accordingly, it is a basic object of the invention to disclose several unique integrated magnetic switchmode power converters and circuits to which the start-up circuit of the present invention may be applied.

Another object of the invention is to disclose a highly efficient start-up circuit for a converter of the type having at least one solid-state switch which is operated in response to current flowing through the drive winding of a control transformer and which controls the flow of current through the converter.

It is another object of the invention to disclose a converter start-up circuit which uses easy to obtain components and which advances the art of integrated magnetics.

Other advantages and features of the invention will become readily apparent from the following detailed description of the invention, and the embodiments thereof, and from the claims and from the accompanying drawings.

BRIEF DESCRIPTION OF THE DRAWINGS

FIGS. 4 and 4A are diagrams of the converter core material chracteristic of a two-bobbin core;

FIGS. 5, 5A and 5B are schematic diagrams of the front end of other converters;

FIGS. 8 through 12 are schematic diagrams of additional embodiments of converters to which the invention may be applied.

DETAILED DESCRIPTION

Figure 1:
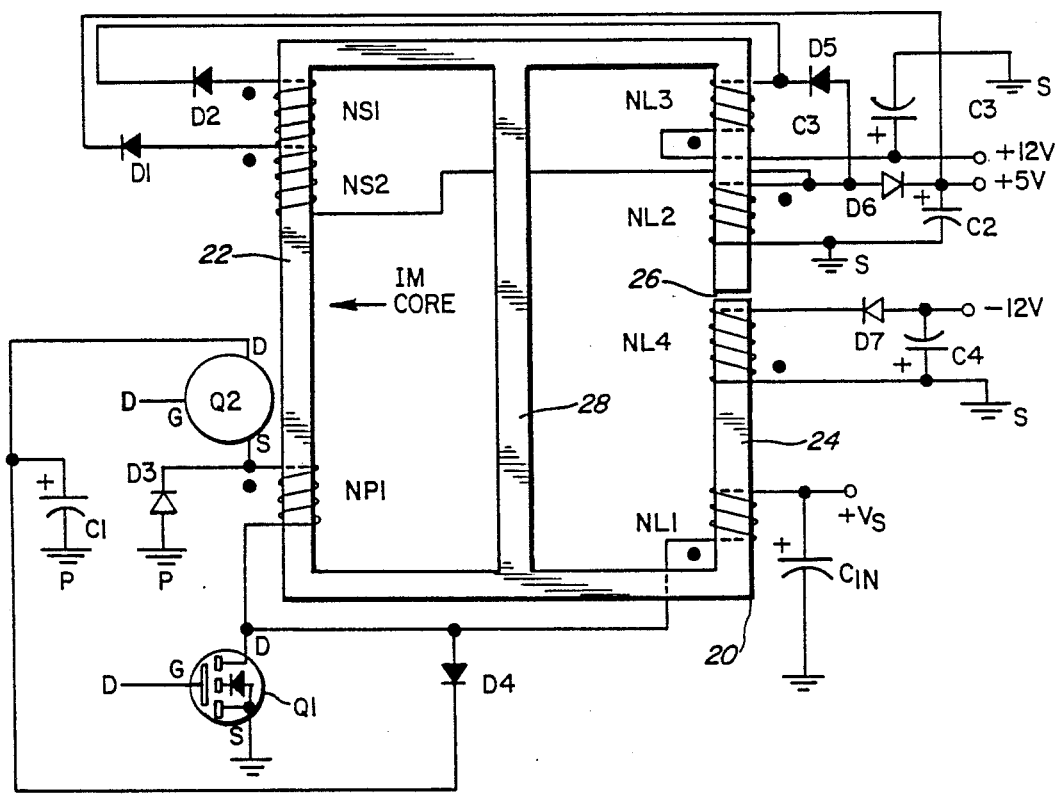
FIG. 1 is a schematic diagram of a transformerisolated forward, or buck, converter topology (proceeded by a boost converter circuit) to which the start-up circuit of the invention may be applied.

While this invention is susceptible to embodiment in many different forms, there is shown in the drawings, and will herein be described in detail, several preferred embodiments of the invention. It should be understood, however, that the present disclosure is to be considered as exemplification of the principles of the invention and that it is not intended to limit the invention to specific embodiments illustrated.

Throughout the discussion which follows, it should be understood that the terms "diode", "switch", "capacitor", "transformer", "inductor", and "winding" are used in the functional sense and not exclusively with reference to specific solid-state components, mechanical equivalents, or discrete devices. Before focusing on detailed design considerations and circuit arrangements, one basic design for a power converter will be described in detail.

BASIC CONVERTER

The power converter design, shown in basic form in FIG. 1, is based on a transformer-isolated forward, or buck, converter topology that is preceded by a boost converter circuit. The primary advantage of this tandem arrangement of converter stages is both low and non-pulsing input and output current characteristics. Also, this converter can be designed for lower variations in switch ON times with large variations in input voltage and output loads relative to a comparable single-stage converter. The ideal end-to-end DC voltage gain of this converter is simple $nD/(1-D)$, where "D" represents the duty cycle of conduction of both converter switches Q1 and Q2 over one switching cycle of power conversion, with "n" representing the secondary-to-primary turns ratio of the applicable "transformer" part of the IM (integrated magnetics) assembly (e.g., for the +12 V output, $n=(NS1+NS2)/NP1$). Note, winding "dots" are relative to winding NP1 in FIGS. 1 through 12.

The IM assembly itself consists of a special E-E ferrite core 20 (Also see FIG. 2) designed to accommodate two winding bobbins of different sizes on the two outer legs 22 and 24 of the core. Also, one 24 of the outer legs of the core 20 has been modified to include a small air gap 26 for inductive energy storage. This particular leg 24 of the core 20 is designated as the "inductor" portion of the IM; all induction functions are placed on this leg. The remaining ungapped outer leg 22 of the core structure 20 is designated as the "transformer" section of the IM, where all of the transformer functions are located. The third, or inner, leg 28 of the core 20 is empty of any winding bobbins, and provides a common magnetic flux path for both transformer and inductor operations.

The steady-state operation of the power stage of the converter of FIG. 1, over one switching cycle will now be explained. At the beginning of a switching period, both power switches Q1 and Q2 are turned fully ON, allowing energy stored in a filter capacitor C1 to be transferred to the outputs of the converter (via windings NP1, NS1 and NS2), and to the corresponding inductive windings NL2 and NL3 on the other leg 24 of the core structure 20. During this time, secondary diodes D1 and D2 conduct, while output commutation diodes D5 and D6 are kept in an OFF condition. Thus, energy is stored in the inductive leg 24 of the core (via windings NL2 and NL3). On the −12 V output, diode D7 is also kept in an OFF state, permitting filter capacitor C4 to supply load current for this particular output.

Energy buildup in the inductive leg 24 of the core 20 is also being enhanced by current in winding NL1 during this time period (noted as "DTs", where DTs is that part of the switching period when Q1 and Q2 are ON). Current through this particular inductor winding is the dynamic input current to the converter, and is controlled by Q1. Diodes D3 and D4 do not conduct during time DTs.

When Q1 and Q2 are turned OFF by the control system of the converter, both diodes D3 and D4 assume a conduction state, with energy stored earlier in inductive winding NL1 now used to replenish lost energy in capacitor C1 during the switching period Dts. Also, any magnetization energy stored in the transformer leg of the core is now returned to capacitor C1 via D3 and D4.

During the OFF time of Q1 and Q2, IM winding voltage polarities reverse, turning OFF secondary diodes D1 and D2, and allowing diodes D5, D6 and D7 to direct inductive energies associated with NL2, NL3, and NL4 to the three outputs (i.e., +12 V, +5 V, −12 V) of the converter. When Q1 and Q2 are turned ON once again by the control system for another switching cycle, the circuit actions just described are repeated.

Thus, the dynamic current waveforms appearing at the input terminal of the converter (noted as $+V_S$ in FIG. 1), as well as at the +5 V and +12 V outputs points, are nonpulsating with soft rise-and-fall slopes. Capacitors C2 and C3 provide for further filtering of voltage ripple magnitudes produced by these output ripple currents. Since all pulsating currents produced by the converter ON/OFF operations just discussed are contained within the converter system itself, additional input and output filter elements for further noise reduction are either completely unnecessary, or significantly reduced in number and physical size.

Referring to FIG. 1, it should be noted that the secondary windings and corresponding inductive windings on the IM are not isolated form one another, since there is no requirement for separation of output ground potentials of the three DC outputs from the system. This permits a splitsecondary winding arrangement and a separation of inductive windings as noted in FIG. 1, so as to achieve a closer tracking of the +5 V and +12 V outputs as their loads are changed, or as the converter regulation system adjusts the duty cycle "D" of the input power switches Q1 and Q2. Here, windings NS2 and NL2 see the sum of the +5 V and +12 V currents, while NS1 and NL3 see only +12 V current magnitude. This tracking method and winding arrangement is somewhat similar to that used in secondary winding methods for fly-back DC-DC converters where all outputs share a common ground return.

FURTHER DESIGN ENHANCEMENTS

Figure 3:
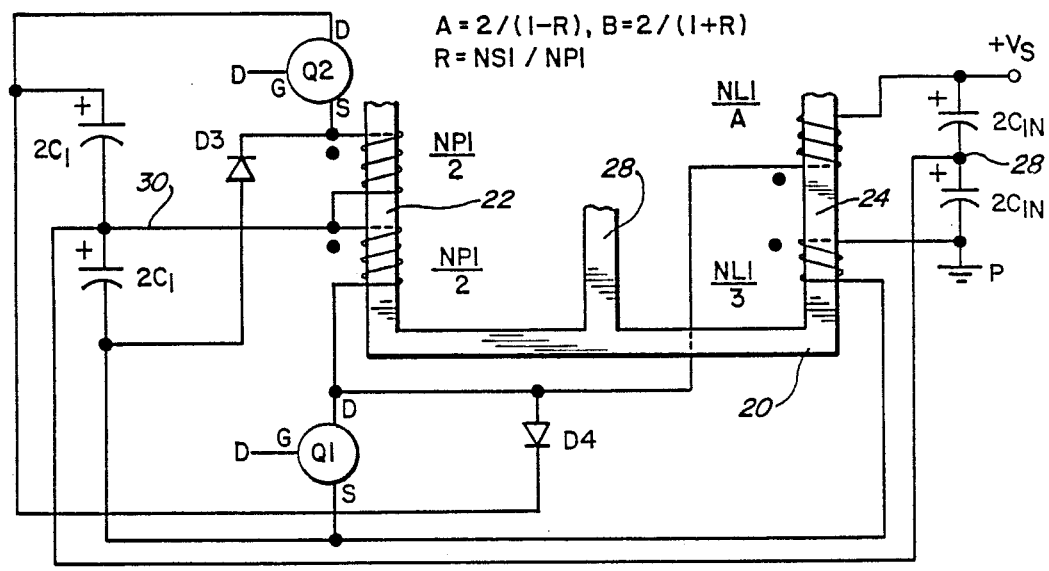
FIG. 3 is a partial schematic diagram of an improved embodiment of the converter shown in FIG. 1.

Alterations to the basic IM converter design of FIG. 1 can be made which can provide improved stress conditions on components therein, plus further reduced conducted common-mode noise on its input power line. Referring now to FIG. 3, the internal storage capacitor C1 of FIG. 1 can be separated into two essentially equal series parts 2C1 and 2C1, and the primary winding NP1 of the IM split into two parts NP1/2 in a like manner and tied to the series connection point 30 of these two capacitors. This variation allows two essentially equal capacitors of lower voltage ratings and incresed RMS current capability to be used for C1. Also, the splitting of the primary winding NP1 into two equal parts with a common connection point 30 to the series capacitor assures that Q1 and Q2 will see an OFF voltage stress of nominally ½ that appearing at the "+ terminal" of the upper half of the dual-capacitor network.

To reduce common-mode voltage and corresponding noise at the input terminals of the converter stage, the input inductive winding NL1 in FIG. 1 can be split, as diagrammed in FIG. 3. Here, the coefficients of the "split" division A and B are not equal in all designs in order to achieve the best common-mode voltage reduction, also as noted in FIG. 3. For example, suppose that the NS1/NP1 turns ratio is chosen as the reference ratio for determining the division of the NL1 winding, and that its value is 1/60, which would be equal to "R" in the equations shown the upper part of FIG. 3. Therefore, the upper coefficient for division, noted as "A" here, would be made by design to be 120/59, or 2.034, while the lower coefficient "B" would be 120/61, or 1.967. While both A and B values in this example are very close to an "equal" split of 2, even a slight difference can produce improvement in common-mode voltages noise, making the split-winding method, shown in FIG. 3, for NL1 highly desirable.

Finally, since the input capacitor bank $C_{IN}$ of an AC-to-DC converter is normally split into two series parts (each of value $2C_{IN}$) to accommodate voltage-doubling under 120 V line operation, the common connection 28 of this bank can also be tied to the split point 30 of the internal capacitor bank. This insures, once again, an equal division of voltages on all power capacitors of the converter at all times.

IM CORE SIZING AND BIAS CONSIDERATIONS

Figure 2:
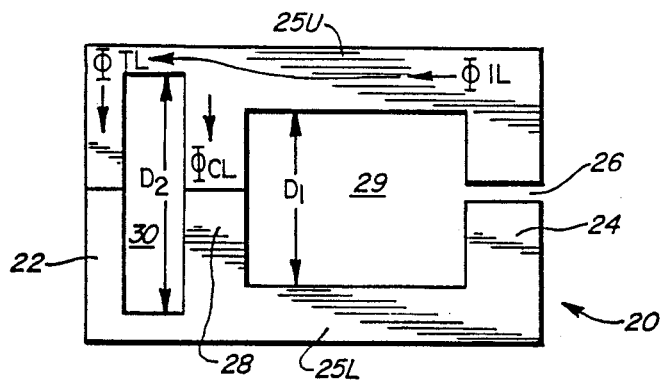
FIGS. 2 and 2A are a plan view and a crosssectional side view of the core of an integrated magnetic converter.

From FIG. 1, it is evident that the two window areas of the IM structure must be large enough to house the windings of each outer leg bobbin. FIG. 2 shows the core 20 of FIG. 1 with its windings removed. Unlike conventional E-E core designs where a single bobbin is used and is mounted only on the inner leg of the core structure, the converter core 20 of this invention is radically different.

Figure 2A:
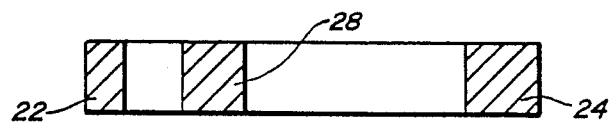

First of all, the window areas on each side of the inner leg 28 are different. A larger window area for inductor windings (leg 24) is shown in contrast to that area required for transformer windings (leg 22). Secondly, the cross-sectional areas of the three short legs 22, 24, and 28 of the core 20 are not equal (See FIG. 2A) with the largest window area 29 is allocated for the leg 24 where the inductive winding bobbin will be mounted. The smallest window area 30 is allocated for the other outer leg 22 where the transformer winding bobbin will be located. The inner leg 28 has a cross-sectional area slightly smaller than the inductor leg 24 (since a large portion of the flux developed by the inductor windings will pass through this particular leg). Finally, from FIGS. 1 and 3, it is evident that at least five windings need to be mounted on the inductor leg 24 of the core 20, while only four windings at most are needed on the transformer leg 22, remembering that both NP1 and NL1 will be split winding arrangements.

As far as flux bias produced by the inductor windings is concerned, FIG. 2 shows what is to be expected. Total bias is the sum of the effect of each of the four inductor windings, with a portion of the total bias seen in each of the other two legs of the core. Bias directions are a direct function of the phase relationships between the inductor windings and the transformer windings. Because the relative value of the reluctance of the gapped inductive leg 24 is much larger than those posed by the other two ungapped core legs 22 and 28, very little flux change produced by transformer winding action will be seen in the inductive leg of the core. However, a significant amount of flux produced by the inductor windings will be seen in the inner 28 and transformer leg 22 of the core 20. This unique situation permits the design of the transformer portion of the IM to be accomplished almost independently from the inductor portion.

The magnitude of the flux bias in each leg is dependent on cross-section areas of the three legs of the core 20, since the reluctance value for each leg is inversely proportional to its area and directly proportional to permeability of the core material. Thus, the area of each leg must be made large enough to sustain its inductive bias plus any additive AC flux magnitudes produced by all other windings.

Because of the high degree of isolation between transformer and inductor legs made possible by the presence of the air gap 26 in the inductive outer leg 24, the bias developed by the inductive leg can be used in a very unusual and effective manner.

Figure 4A:
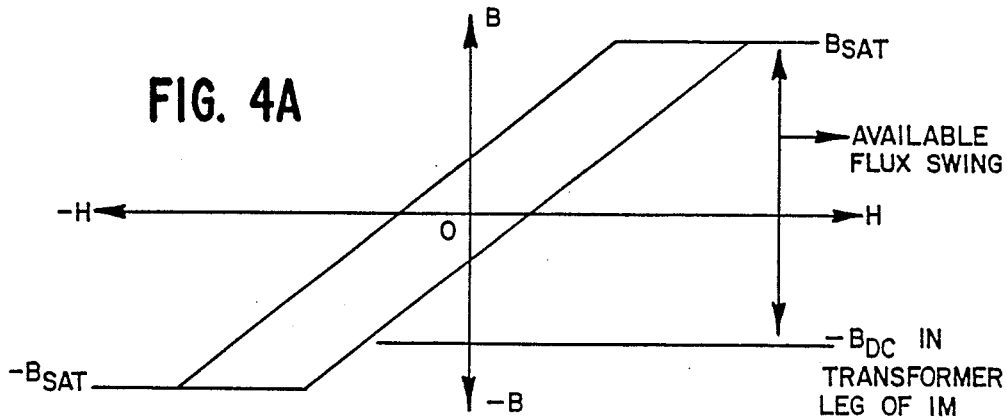

As shown in FIG. 4, in a conventional transformer core used for a transformer-isolated forward, or buck, converter, available flux swing for selecting transformer turns is simply the difference between residual flux $B_{res}$ in the core and the maximum saturation flux level $B_{sat}$ of the core material. However, the bias produced by the inductive leg 24 in the transformer leg 22 of IM core of FIG. 2, allows a much larger swing in flux, as diagrammed in FIG. 4A, since the flux inductive bias will oppose that produced by transformer action. Therefore, transformer turns needed can be reduced significantly. This, in turn, implies a smaller window area needed for the transformer windings of the IM core structure, plus a corresponding savings in copper power losses for these particular windings.

IM DYNAMICS

Figure 1A:
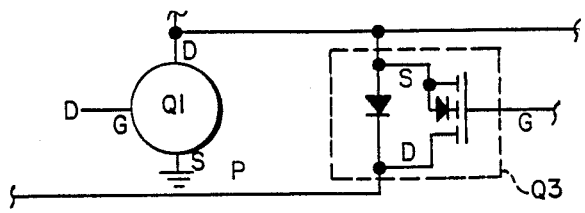
FIGS. 1A through 1E are partial schematic diagrams of other converters to which the invention may be applied.
Figure 1E:
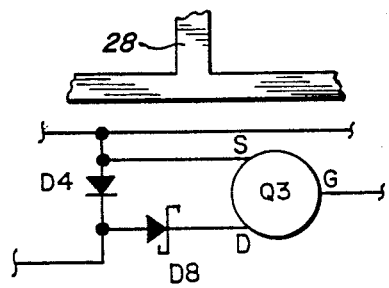

It can be shown (See "Discontinuous Inductor Current Mode in the Optimum Topology Converter", Paper No. 21, pp 369–372, TESLAco Power Electronics Series, Vol 2.) that, for a boost-buck converter system, continuous energy storage in the reactive components will occur if the minimum duty cycle of switch conduction is kept *greater* than or equal to 0.5 or 50%. This requirement conflicts with the need to provide adequate time for removing the magnetization energy of the transformer part of the converters of FIGS. 1 and 3. Since the primary turns NP1 or NP1/2 are used for both power delivery and reset functions, the duty cycle of the switches Q1 and Q2 must be limited to *less* than or equal to 0.5 or 50%. To satisfy these two conflicting operating conditions, the implication is that the duty cycle of the switches Q1 and Q2 (See FIG. 1) must be *always* equal to 50% regardless of the input voltage or the output load changes. Since the regulation control system is designed to adjust the duty cycle with such changes to maintain constant output voltages, the converter designs of FIGS. 1 and 3 can be made to operate, in a practical embodiment, if any of the following changes are made:

(1) Change diode D4 in FIG. 1 to a bi-directional switch element Q3 (See FIG. 1A) to allow the boost portion of the converter to operate always in a continuous mode of energy storage regardless of the reflected load from the buck portion. This will allow passage of current through winding $N_{L1}$ in both directions, thus allowing capacitor C1 to discharge unused energy back to the input source $V_S$ under light load conditions on the converter's outputs. FIG. 1E shows another circuit comparable to that of FIG. 1A, using switch Q3 and diode D8 to provide a bi-directional path around diode D4.

Figure 1B:
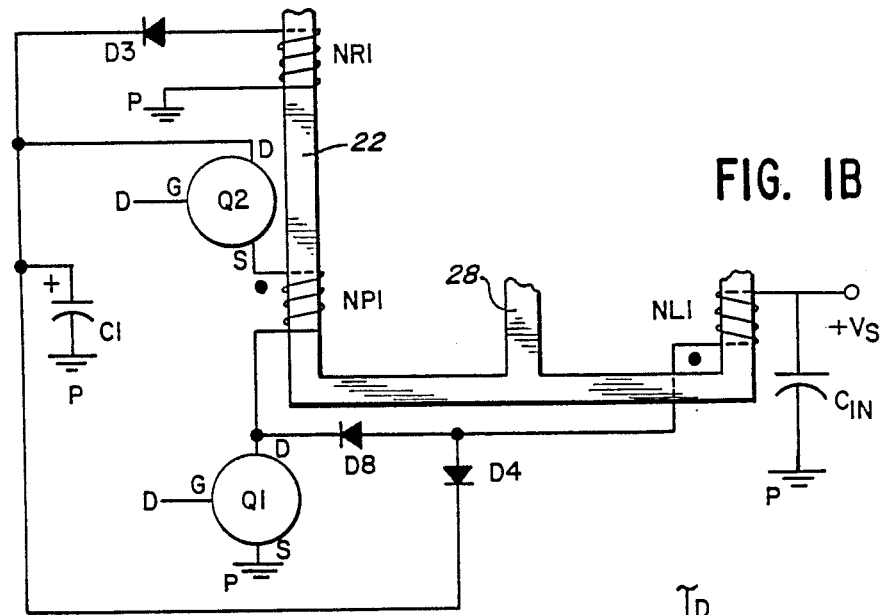

(2) Add a separate reset winding NR1 (See FIG. 1B) for the transformer leg 22, with appropriate turns to allow a shorter reset time, thus increasing the maximum duty cycle allowed for Q1 and Q2 beyond 50%.

(3) Change the power transfer characteristic of the boost portion of the converter such that the boundary of minimum duty cycle of 50% is changed to a lower value, say 25%. This would permit a usable range of duty cycle of control for output voltage regulation against line and load changes.

Change (1)

To accomplish this change requires the use of a power MOSFET device (See FIG. 1A) in place of diode D4, with gate drive applied at times when the two main converter switches Q1 and Q2 are in an OFF state. This change also requires the addition of another drive winding on the control circuit isolation transformer, a minimum of two gate drive resistors and some snubbing network to reduce the turn-on/turn-off energy transients. It can be shown that all three switches Q1, Q2 and Q3 would need to have a drain-to-source break down rating of greater than 534 volts, ideally (for D=25% and a 400 V line voltage).

Change (2)

To accomplish this change, means another winding must be mounted on the transformer bobbin, increasing the adjacent window area and size of the IM. The number of turns of this winding would have to be lower than those on the primary winding in order that the switch duty cycle maximum could be extended beyond 50%. Diode D3 (See FIG. 1B) is used to commutate the reset energy to capacitor C1 for this winding. Another diode D8 is needed to isolate C1 from switch Q1. The "off" voltage stress on Q1 and Q2 will increase due to the reduction in reset time. For a duty cycle value of 67%, it can be shown that the voltage across the capacitor C1 would be about 600 volts and the reflected voltage into the primary from the reset action during the same time will be approximately 1,200 volts. Thus, the OFF-voltage stress seen by the two switches Q1 and Q2 in FIG. 1B would be on the order of 900 volts. For this reason, the reset method of FIG. 1B, while feasible, may not be acceptable since the voltage stress levels for Q1 and Q2 may approach to that of present state-of-the-art devices, namely 1,000 volts.

Figure 1C:
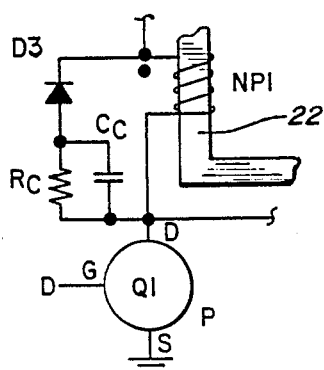
Figure 1D:
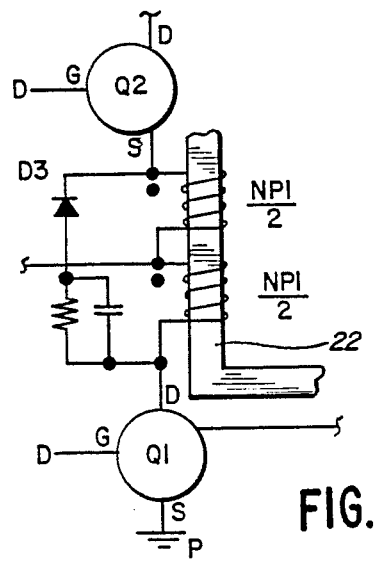

An alternate method for implementing change (2) would be to use a dissipative averaging reset approach, where reset voltage is maintained and adjusted to a proper level as a function of the voltage on capacitor C1. This method is illustrated in FIGS. 1C and 1D, for the converters of FIGS. 1 and 3, respectively (Also, see "International Rectifier HEXFET Data Book", 1982-1983 Edition, pp A-87 through A-98). It can be shown that the stress levels in switches Q1 and Q2 would be about 100 volts less than that of change (1) and that a 1,000 volt device would be acceptable for switches Q1 and Q2, which devices are readily available. However, it must be remembered that this solution is a dissipative one, one in which power is wasted in resetting the core.

Change (3)

Change (3), if it can be accomplished without a significant addition of more parts to the converter and/or increases in stress on converter components, is the most desirable. However, how this change in power transfer characteristic can be implemented without altering the desired boost-buck nature of the converter systems of FIGS. 1 and 3 is not at all obvious.

It should be apparent that any acceptable solution must alter the boost portion of the converter such that minimum duty cycle to maintain continuous mode can be moved below 50%, and to a point where duty cycle can be practically varied to regulate outputs with changes in input and output voltage loads. Also, such alterations must not cause excessive stress on switches or diodes and, ideally, should be accomplished with the least number of new components.

Consider the boost part of the converter arrangement of FIG. 5. which follows the teachings of this invention. Looking at the left-hand portion of the figure, the basic boost topology has been altered to add one-half of its output voltage in series with each switch QB1 and QB2, rather than connection of the switch to the return terminal of the input source, as is done in a conventional boost converter topology. Also, it is assumed that the value of this added source voltage is of the polarity shown.

Assuming, that the boost part of the converter in FIG. 5 is operating in a continuous mode of energy storage, the ideal input-to-output voltage transfer function of the revised boost section can be evaluated by establishing the volt-second balance relationship across the inductor L over one switching period of performance. By comparing the requirement for the continuous mode operation defined for the boost design of FIG. 5 against that needed for the boost section of FIGS. 1 and 3, it can be shown that, for minimum duty cycles greater than $\frac{1}{3}$ or 33%, the design of FIG. 5 has a lower boundary limit for a given minimum load, switching frequency and inductor values. This new design also has a lower limit on maximum switch duty cycle over that of the conventional approach, namely 50%, ideally, rather than 100% for the basic circuit. This fact alone suggests that the new design shown in FIG. 5, if used in place of the basic boost part of the IM converter arrangement of FIG. 1, will allow operation of both the boost and buck portions in a continuous energy storage mode below the 50% limit previously established.

Consider now the interface required between the design of FIG. 5 and that proposed earlier in FIG. 3 for the "split" input inductor enhancement to the "forward" or buck portion of the IM converter. Since all four switch sets illustrated in FIG. 5 operate at the same duty cycle, it is possible to eliminate the switch sets associated with the boost stage QB1 and QB2 by allowing Q1, Q2, D3 and D4 to perform their functions. The unique design that results from this elimination is illustrated in FIG. 5A. Note that two isolation diodes D8 and D9, each in series with one-half of the primary winding NP1, are now required to keep this split winding isolated from the input source. Also, the primary winding must now be split into two separate but equal windings, rather than a split, or tapped, arrangement illustrated in FIGS. 3 and 5.

If a comparison is made now of the basic converter design of FIGS. 1 and 3 to that of FIG. 5A, it is found that two isolation diodes (D8 and D9) hve been added over that of the original converter. Also, the split primary winding of the IM must now be changed to two separate but equal windings, and the location of diode D3 must be changed. FIG. 6 shows the design of FIG. 5A in a format identical to that of FIG. 3 for comparison purposes.

Figure 5B:
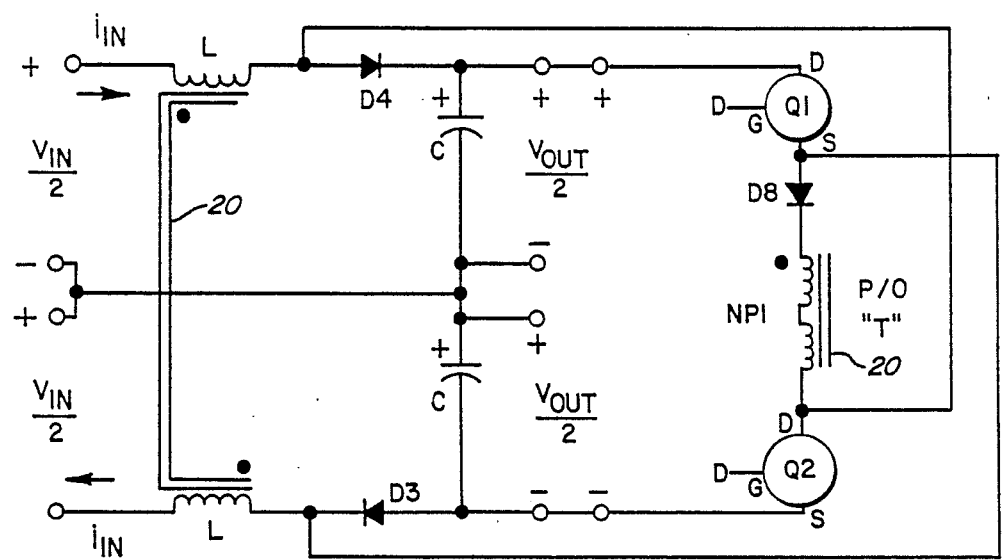
Figure 8:
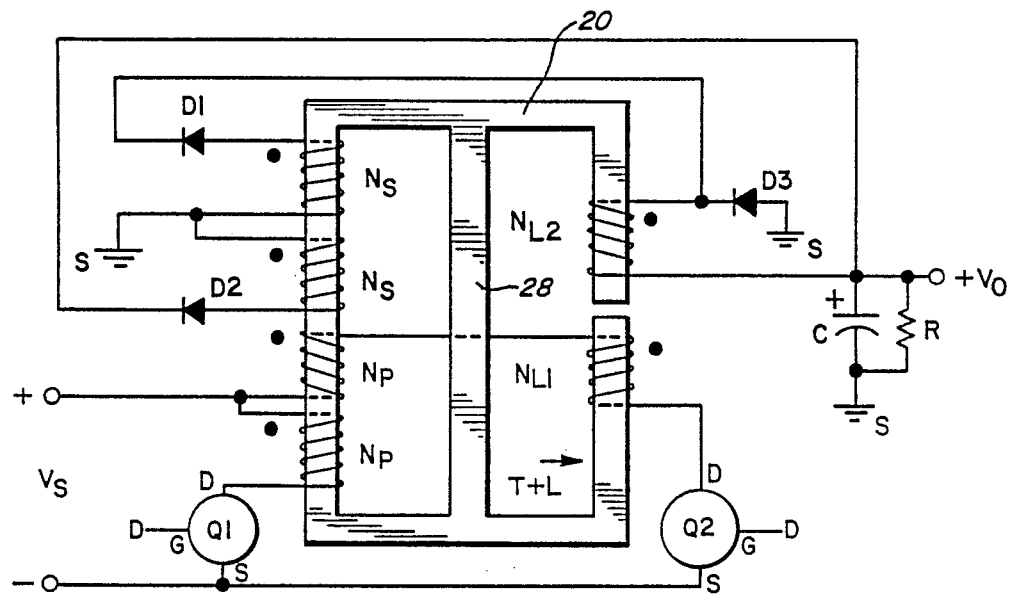
Figure 6:
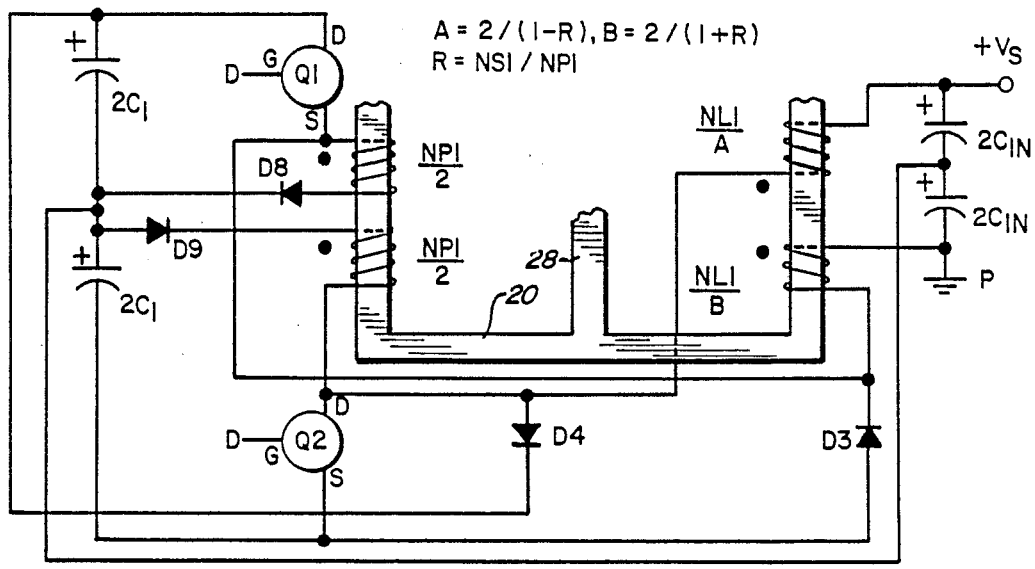
FIGS. 6 and 6A are partial schematic diagrams of still other embodiments of converters.
Figure 6A:
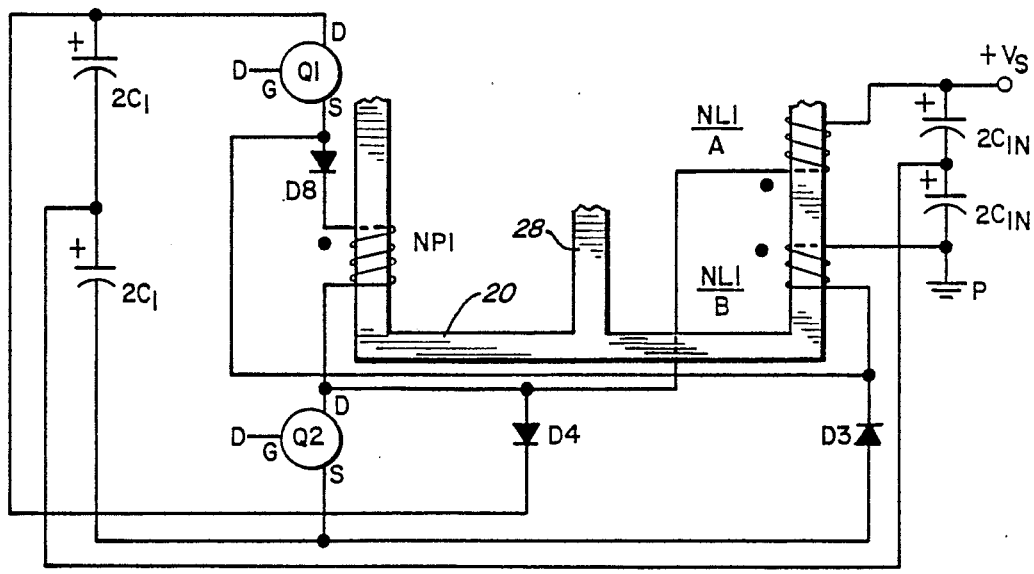

Even simpler versions of FIGS. 5A and 6 can be realized by eliminating the split primary windings, and by using only one isolation diode in series with the total primary winding. The new circuits are shown in FIGS. 5B and 6A, respectfully, where diode D8 is the needed isolation diode for the single primary winding. Therefore, in these versions, only one more diode is added to the basic design over that in FIGS. 1 and 3.

It can be shown that a usable range of duty cycle control between 25 and 50 percent exists for the IM converter of FIGS. 5A, 5B, 6 and 6A. It also can be shown that in the circuit version shown in FIGS. 5B and 6A, the voltage stress levels for D3 and D4 are the same, while the single isolation diode D8 will see the total output voltage of the boost section, or 800 volts. Thus, the rating of D8 in this regard would be twice that needed for the isolation diodes D3 and D4 of FIGS. 5A and 6.

COMPARISONS—ALL CHANGES

Based on the foregoing discussion, a summary table can be formulated of the pros and cons of each circuit change. This table is shown below:

TABLE I

| ITEM | CHG #1 | CHG #2 | CHG #2A | CHG #3 |
|---|---|---|---|---|
| # MosFet Switches | 3 | 2 | 2 | 2 |
| # Diodes (primary) | 3 | 3 | 3 | 3 min |
| $V_{D-S}$ (max) ideal | 534 V | 909 V | 800 V | 800 V |
| $V_R$ (primary diodes) | 534 V | 606 V | 800 V | 800 V |
| D range | $\leq 0.5$ | $\leq 0.5$ | $\leq 0.5$ | 0.25 to 0.5 |
| $L_1$ value** | $L_2/n_1^2$ | $L_2/n_1^2$ | $L_2/n_1^2$ | $L_2/n_1^2$ |
| $n_1$ value | 1/20* | 1/60* | 1/60* | 1/30* |

*Assumes minimum duty cycle of 25% at high line, and 75% transformer efficiency.
**Where $n_1$ is $N_{S2}/N_{P1}$, $L_1$ is the primary inductance and $L_2$ is the output inductance.

From Table I, it is evident that either alternatives for circuit change (2) will result in more primary turns for the transformer section of the IM than those noted for change (1) or change (3). However, for change (3), the relative inductance of the primary inductive winding $L_1$ will need to be four times larger than the other three circuit alternatives, implying the need for more turns in this area for the IM.

Thus from Table I, change (1) offers the lowest OFF voltage stress to all primary switches and diodes, allowing a less-expensive MOSFET devices to be used over those needed for changes (2) or (3). However, as noted earlier, change (1) will require additional parts for driving the extra MOSFET device plus those needed for voltage snubbing. In addition, because of the relative slow recovery times expected from the internal body-to-drain diode of Q3 in FIG. 1A, an external commutation diode will be needed to perform this function. Also, to prevent conduction of the MOSFET diode, another low-voltage diode (Schottky) must be added in series with Q3. Thus, a practical implication of this solution will add two more diodes to the circuit of FIG. 1A, as illustrated in FIG. 1E.

Circuit change (3), while adding one more diode to the basic design concept of the converter and having voltage stress levels comparable to alternate change (2), but 266 volts greater than change (1), is attractive in that no additional MOSFET devices are required. For these reasons, change (3) is considered optimum. Devices to be considered for these MOSFETS are the Philips (Siemens) BU 50A and the MOTOROLA MTP3N100 or MRH5N100. These parts have a breakdown rating of 1000 V and drain current maximums well within those needed for a 100 W converter application.

DETAILED EMBODIMENT

Figure 7:
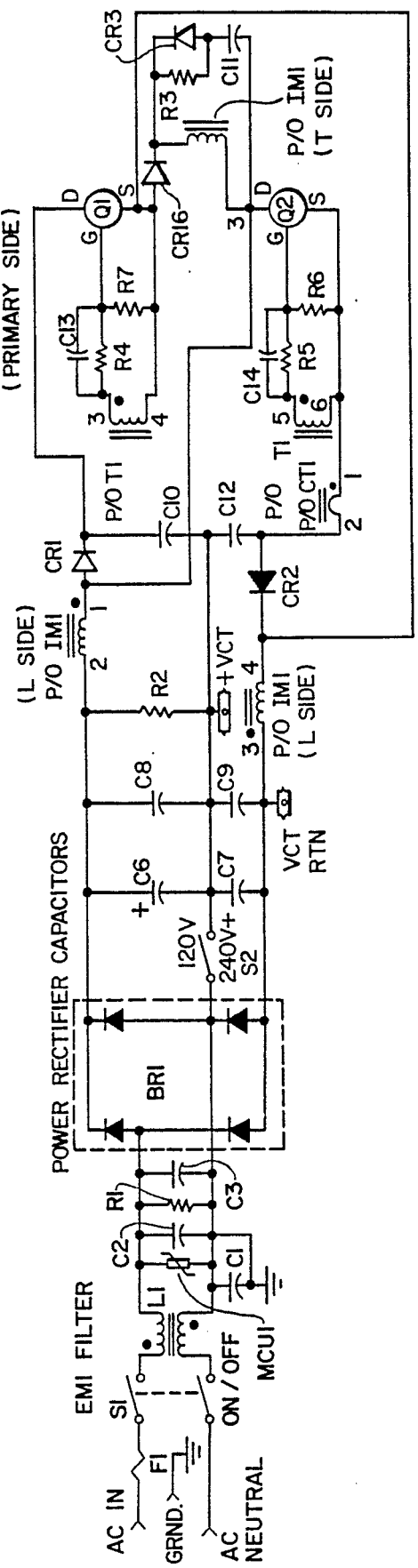
FIGS. 7, 7A, and 7B are detailed schematic diagrams of one practical embodiment of a converter system which incorporates the principles of the invention.
Figure 7A:
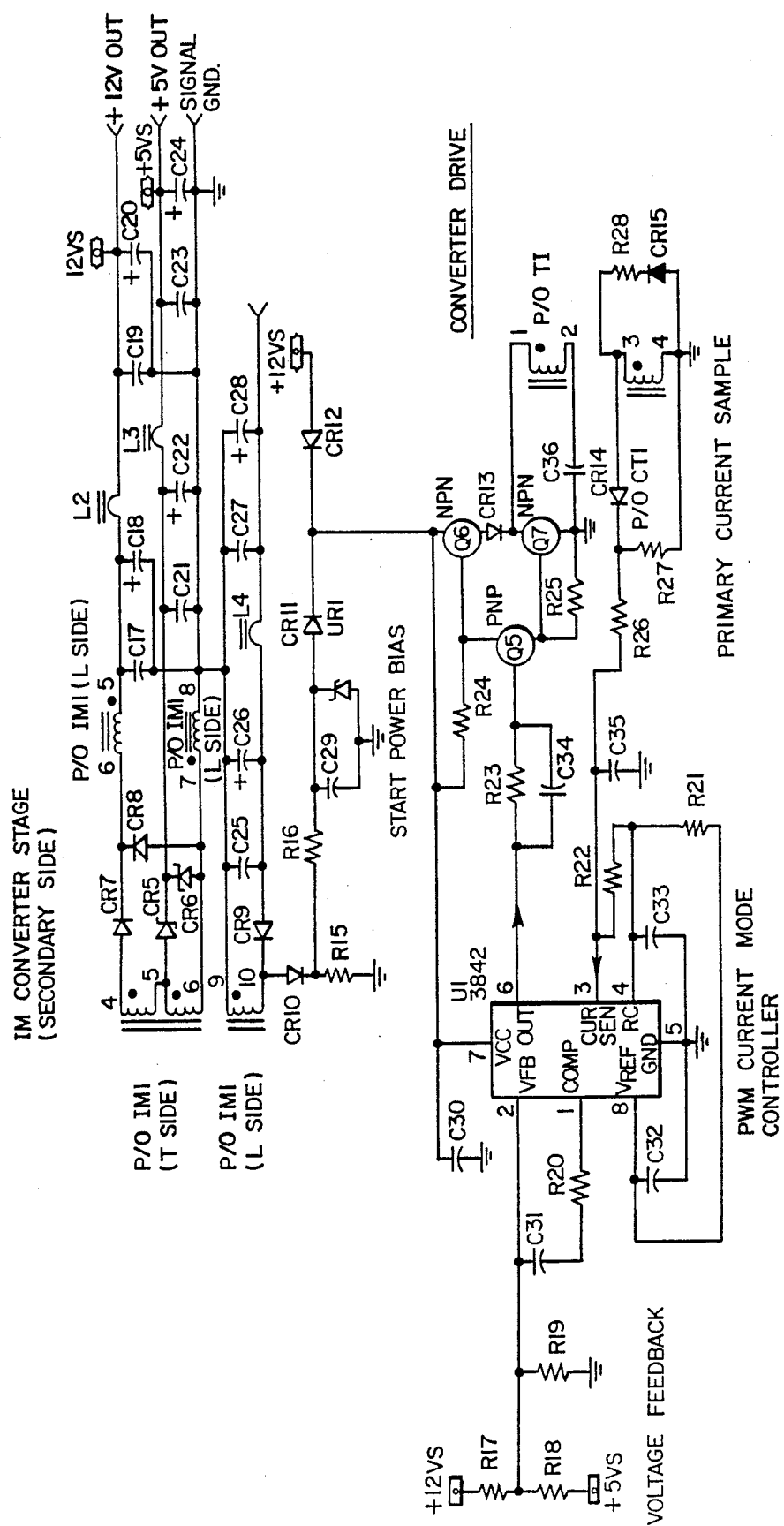

FIG. 7 is a circuit schemtic of the IM power converter system of FIG. 3 embedded within a complete power supply, including AC-to-DC networks to develop the high DC input voltage for it, a starting network, and current-mode regulation control circuits. Important circuit areas and functions are noted by the captions on FIGS. 7, 7A and 7B. This converter is designed to deliver 100 watts of power to three different DC outputs of +5 V, +12 V, and −12 V. Incoming AC potential can range between 90 VDC and 270 VDC. The core of the integrated magnetics (IM1), for a 100 KHz operating frequency, can be made of ferrite material.

The AC-to-DC rectifier network, plus the EMI FILTER circuit preceding it, is of a conventional design, with a simple manual switch S2 indicated for accommodating either a 120 V, 60 Hz or a 240 V, 50 Hz AC input voltage.

The START-UP CIRCUIT is unique, in that starting power is developed directly through the main IM converter stage, rather than using a separate bias converter. At AC power application, a DC voltage VDC is applied to the start circuit, which charges capacitor C15 to a potential where Q3 and Q4 turn ON. Resistors R9 and R10 set the start potential threshold voltage magnitude. With Q3 and Q4 ON, the energy built up in C15 is then dumped into winding 7–8 of the gate drive transformer T1, which controls the main IM converter power switches Q1 and Q2. This short pulse of energy then turns ON switches Q1 and Q2 which, in turn, produce a voltage at winding 9–10 of the IM of a polarity to allow capacitor C29 to be charged rapidly to the voltage level of zener diode VR1. The energy stored in the capacitor C29 by this action allows the regulation integrated circuit U1 to be activated, as well as the output CONVERTER DRIVE network (composed of Q5 through Q7). The pulse-width-modulation (PWM) network within U1 then takes control of the DRIVE NETWORK, turning ON and OFF Q1 and Q2, via T1, until output voltages build up to their desired values.

Once the CONVERTER DRIVE network is controlled by the PWM actions of U1, the START-UP CIRCUIT is disabled. The disable method is via T1, such that each time Q7 in the CONVERTER DRIVE network is turned ON, winding 7–8 receives a pulse of voltage polarity to once again turn ON transistors Q3 and Q4. Specifically, negative pulses are used to discharge capacitor C15, while positive pulses are used for normal turn-ON of the converter switches Q1 and Q2. This prevents the build-up of sufficient energy in C15 to turn ON Q4 in the manner discussed earlier upon the initial application of AC power to the system. Diode CR4 prevents loading of the positive turn-ON pulses by the start circuit. The negative pulses, applied from windings 1-2 of the drive transformer to windings 7-8, in conjunction with the voltage or capacitor C15, appear as a summed potential across the combination of transistors Q3 and Q4; this causes them to conduct and to dump energy from capacitor C15 back to the control circuit, where it is dissipated. Capacitor C16 and resistors R13 and R14 are leakage current and noise reduction components to prevent turning ON Q3 and Q4 from those factors.

The CONVERTER DRIVE network is designed so as not to load the start-up winding 7-8 on T1 during an actual start-up sequence. This blocking action is performed by diode CR13 and the base-to-collector diode of Q7 in the CONVERTER DRIVE network. Once the +12 V output has reached its desired value, it is used to power U1 and the converter drive system via CR12. Energy is no longer drawn from C29 since diode CR11 will become reverse-biased.

To maintain voltage regulation of outputs during steady-state operation, both the +12 V and −5 V lines are used to provide a sample of output potentials for PWM control purposes. This is performed by the VOLTAGE FEEDBACK network of resistors R17, R18, and R19. Frequency compensation for stability of voltage regulation control are the functions of C31 and R20. The 100 KHz switching frequency of PWM operation of U1 is set by resistor R21 and capacitor C33. The primary CURRENT SAMPLE of dynamic switch currents in the IM converter is taken via current transformer CT1, and transformed to a voltage value via CR14 and resistor R27 tied to the secondary of CT1. This sample is then passed through a high-frequency RC filter (R26 and C35) to remove undesirable switching noise, and is then used internally by U1 with the output voltage samples to determine the duty cycle of condition of the power switches within the IM converter to maintain constant output potentials with changes in loads and input AC line potential.

Figure 7B:
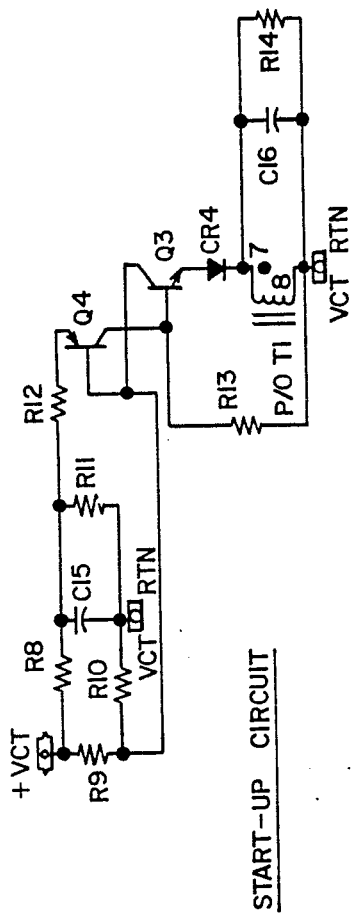

Typical values of the components illustrated in FIG. 7B are presented below:

TABLE II

| COMPONENT | VALUE |
|---|---|
| R8 | 100K |
| R9 | 150K |
| R10 | 10K |
| R11 | 470K |
| R12 | 10 |
| R13 | 10K |
| R14 | 20K |
| C15 | 0.1 uf |
| C16 | 100 pf |

Those skilled in the art will appreciate the fact that the values presented in TABLE II are representative and subject to change once the circuit is tested and optimized in a practical embodiment.

OTHER CONVERTERS

Figure 9:
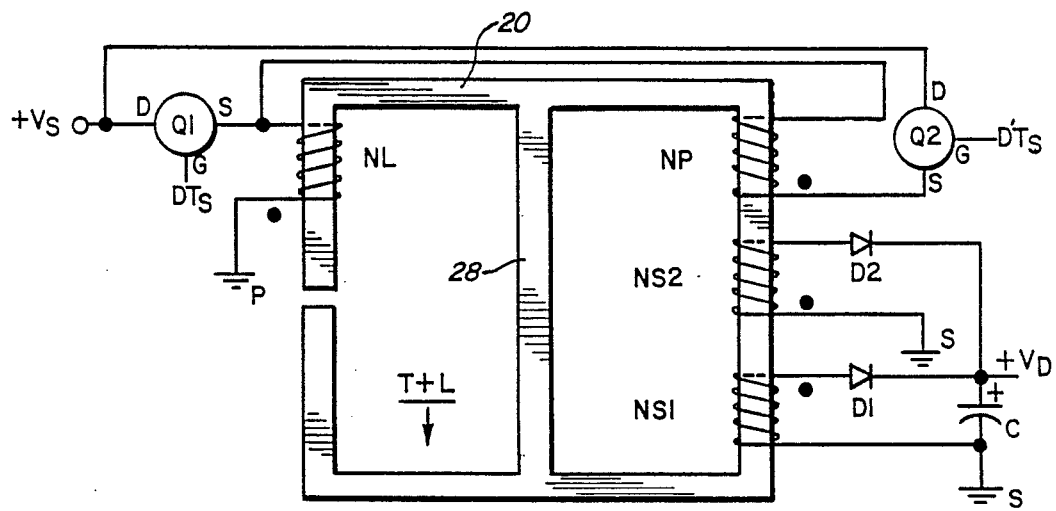
Figure 10:
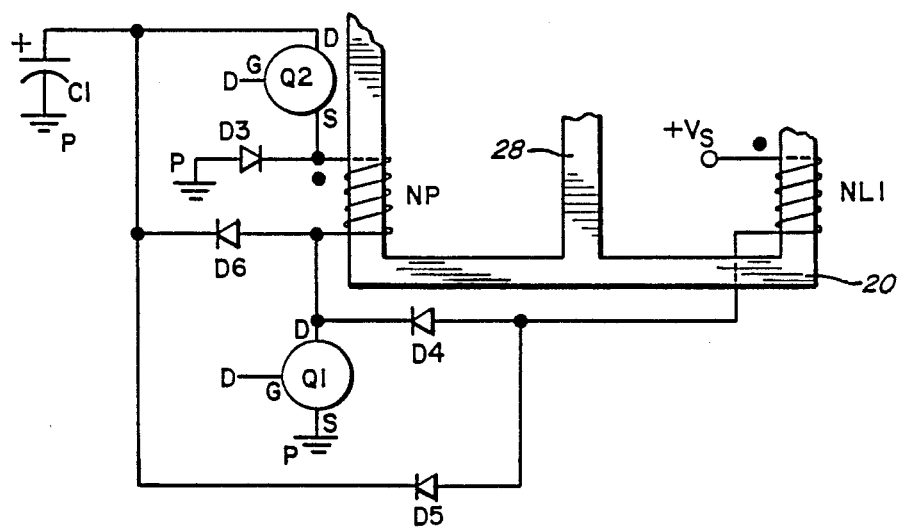

From the foregoing, it will be observed that the invention may be applied to a wide variety of converters without departing from the true spirit and scope of the novel concept of the invention. For example, FIG. 8 discloses an IM push-pull buck converter having a center-tapped primary winding, a center tapped secondary winding, and two inductors, one connected to the primary side of the converter and one connected to the secondary side of the converter. FIG. 9, by contrast, illustrates a boost converter having a single primary winding, two secondary windings, and one inductor winding, with the duty cycle of the switch-controlled primary winding NP and the switch-controlled inductor winding NL being complementary. FIG. 10 illustrates an integrated-magnetic boost-forward converter comparable to the design of FIG. 1, with an added diode D6 for resetting the IM core. All of these embodiments (FIGS. 8, 9, and 10) are two-bobbin designs with a core having one outer leg on which the transformer windings are carried, a center leg, and a gapped outer leg which carries only the inductor windings. These basic principles can be expended to an integrated-magnetic two-bobbin core where the ungapped outer legs carry either primary, secondary, or inductor windings, and wherein the empty center leg is gapped. This concept is illustrated in FIG. 11. Also shown in FIG. 11, are added windings NL2 to each outer leg for control of ripple current appearing at the output of the converter. This control is achieved by proper values of the inductor LT and the capacitor C in FIG. 11, and the turns ratio between windings, NL1 and NL2. Finally, FIG. 12 illustrates an integrated-magnetic boost-forward converter with a bi-directional power flow capability. It should be noted that five solid-state bi-direction switches are used (in FIG. 12) with the duty cycles (D and D') of conduction of all the switches being complementary. Thus, it should be understood that no limitation with respect to the specific structure and circuit arrangements illustrated is intended or should be inferred. It is, of course, intended to cover by the appended claims all such modifications as fall within the scope of the claims.

I claim:

1. In a power converter having a switch which is operated in response to the flow of current through secondary winding means of a drive transformer and which when repeatedly closed causes power to be transferred through the converter, the drive transformer having primary winding means which is energized in response to the output of the converter, a circuit comprising: another winding on the drive transformer which is transformer coupled to the secondary winding means of the drive transformer; a capacitor which is charged to a predetermined level by the application of power to the input of the converter; and means, operated in response to the charging of said capacitor to said predetermined level, for passing a current pulse through said another winding and triggering the converter into operation and for using the flow of current through the primary winding of the drive transformer to prevent said capacitor from thereafter being charged to said predetermined level by discharging said capacitor prior to said predetermined level.

2. A start-up circuit for a power converter of the type having a primary side to which power is supplied, having at least one switch which is operated in response to current flowing in a secondary winding of a drive transformer and which controls the flow of current through the converter and having a controller for controlling the flow of current through the primary winding of the drive transformer, comprising:

(a) another winding which is transformer coupled to the secondary winding of the drive transformer;

(b) a capacitor which is charged by application of power to the input of the converter; and (c) switching means, triggered into operation by the charging of said capacitor and connected in series to one end of said another winding, for switching current from the primary side of the converter to said another winding to place said converter in operation, said switching means being triggered into operation when said capacitor is charged to a predetermined level, said switching means including means for preventing said capacitor from triggering said switching means after the converter is in operation by discharging said capacitor before reaching said predetermined level after said controller is in operation.

3. The circuit of claim 2, wherein said switching means comprises a PNP transistor and an NPN transistor, the collector of said PNP transistor being connected to the base of said NPN transistor, the base of said PNP transistor being connected to the collector of said NPN transistor, the emitter of said PNP transistor being connected to said capacitor and the emitter of said NPN transistor being connected to said one end of said another winding.

4. The circuit of claim 2, wherein a resistor and another capacitor are connected in parallel with each other and said another winding; and wherein a diode connects said one end of said another winding to said switching means.

5. The circuit of claim 2, wherein said switching means functions as a thyristor; and wherein said one switch is a solid-state switch.

6. The circuit of claim 2, wherein said converter includes a pulse width modulated controller for controlling the flow of current through the primary winding of said drive transformer; and energizing means, powered by the output of the converter, for energizing said controller.

7. The circuit of claim 6, wherein said energizing means comprises: a second capacitor charged by secondary windings of the converter which supply said converter output; and a zener diode in parallel with said second capacitor.

8. The circuit of claim 7, wherein said energizing means is connected to said controller by a normally closed switch means; and further including another means for energizing said controller from the output of the converter and opening said switch means once said controller is in operation.

9. In a converter having power transformer means including a primary winding and a secondary winding; having controller means for generating a train of voltage pulses as a function of the output of the converter; having switch means for applying at least a portion of the input voltage of the converter across the primary winding; and having drive means for using the train of voltage pulses to operate said switch means, the drive means comprising a first winding that is adapted to receive the train of voltage pulses from the controller means and a second winding that is transformer coupled to the first winding so as to operate the switch means, a start-up circuit which comprises: transformer isolated voltage sensing means, utilizing the input to the converter and the train of voltage pulses from the controller means, for applying a transformer isolated voltage pulse to said drive means when said train of voltage pulses from the controller means is absent and when a predetermined voltage level is sensed that is a function of the converter input voltage, said transformer isolated voltage sensing means comprising a third winding that is transformer coupled to the first winding and the second winding such that the application of said voltage pulses to the first winding produces a voltage across the third winding and the second winding.

10. The circuit of claim 9, wherein said transformer isolated voltage sensing means comprises: level means, at the input of the converter, for providing said predetermined voltage level in response to the application of power to the input of the converter.

11. The circuit of claim 10, wherein said level means comprises a capacitor that is charged to said predetermined voltage level by the application of power to the input to the converter.

12. The circuit of claim 9, wherein said transformer isolated voltage sensing means further comprises capacitor means which is charged by the application of power to the input of the converter and which is electrically connected to said third winding.

13. The circuit of claim 12, wherein said transformer isolated voltage sensing means further comprises a solid state switch that conducts in response to the combined voltage across said third winding and across said capacitor means exceeding said predetermined level.

14. The circuit of claim 13, wherein said capacitor means is in parallel with the series combination of said solid-state switch and said third winding, such that the application of power to the input to the converter charges said capacitor means to said predetermined voltage level and causes said solid-state switch to conduct and to supply current to said third winding by the discharge of said capacitor means, whereby the switch means is operated, the controller produces said train of voltage pulses in said first winding, said third winding produces a voltage which is in response to the flow of current in said first winding and which turns on said solid-state switch, thereby preventing further charging of said capacitor means to said predetermined level and providing for said second winding to be thereafter operated in response to said controller.

15. The circuit of claim 13, wherein said solid state switch comprises two transistors which are regeneratively coupled to each other.

16. The circuit of claim 13, wherein said solid state switch comprises two transistors connected with positive feedback.

17. The circuit of claim 9, wherein said drive means comprises transformer means having a primary winding which receives the train of voltage pulses and having a secondary winding which is connected to operate the switch means.

18. The circuit of claim 9, wherein said drive means include means for unloading said first winding from said third winding before said controller is placed in operation.

19. A start-up circuit for a power converter having at least one switch which rapidly opens and closes in response to a drive transformer and which controls the flow of power from the input to the output of the converter, the drive transformer comprising primary winding means and a secondary winding means, the primary winding means being energized in response to the operation of a controller which senses the flow of power through the converter, the switch being energized in response to the flow of current through the secondary winding means, comprising:

(a) capacitor means charged to a first level by the application of voltage to the input of the converter;
(b) another winding which is transformer coupled to the primary winding means and the secondary winding means of the drive transformer; and
(c) switch means, operating in response to the voltage potential across said another winding and the charging of said capacitor means to said first level, for discharging said capacitor means through said another winding when said controller is not operating and for discharging said capacitor before reaching said first level when said controller is operating, said switch means being initially operated by said capacitor means when voltage is applied to said converter input, the flow of current from the discharging of said capacitor inducing a voltage in the secondary of the drive transformer whereby current flows through the converter, the controller is energized, and the primary winding means is energized, the flow of current through the primary winding means inducing a voltage in said another winding to keep said capacitor means from charging so high so as to control the operation of said switch means after the controller is operating.

20. The current of claim 19, wherein said power converter employs integrated magnetics.

21. The circuit of claim 19, wherein said capacitor means is in parallel with the series combination of said another winding and said switch means.

22. The circuit of claim 19, wherein said switch means comprises a diode in series with two transistors which are regeneratively coupled to each other.

23. The circuit of claim 19, further including a pulse shaping network across said another winding.

24. A start-up circuit for a power converter of the type having at least one switch which is repeatedly operated in response to current flowing in a secondary winding of a drive transformer and which controls the flow of current through the converter, the drive transformer having a primary winding which is energized in response to a controller which is responsive to the output of the converter, comprising:

(a) another winding which is transformer coupled to the secondary winding of the drive transformer;
(b) a capacitor which is charged by application of power to the input of the converter; and
(c) switching means triggered into operation by the charging of said capacitor to a predetermined value and connected in series to said another winding, for switching current from the primary of the converter to said another winding to place said converter in operation, said switching means including means for preventing said capacitor from triggering said switching means after the converter is in operation by discharging said capacitor before reaching said predetermined level.

* * * * *